(12) United States Patent
Lott et al.

(10) Patent No.: US 7,072,630 B2
(45) Date of Patent: Jul. 4, 2006

(54) ADAPTIVE DATA RATE DETERMINATION FOR A REVERSE LINK COMMUNICATION IN A COMMUNICATION SYSTEM

(75) Inventors: Christopher Gerard Lott, San Diego, CA (US); Jean Put Ling Au, San Diego, CA (US)

(73) Assignee: Qualcomm, Inc., San Diego, CA (US)

( * ) Notice: Subject to any disclaimer, the term of this patent is extended or adjusted under 35 U.S.C. 154(b) by 285 days.

(21) Appl. No.: 10/383,794

(22) Filed: Mar. 6, 2003

(65) Prior Publication Data

US 2004/0176042 A1  Sep. 9, 2004

(51) Int. Cl.
*H04B 1/18* (2006.01)
(52) U.S. Cl. ............................. 455/151.2; 455/452.2; 455/296; 455/306; 455/307; 455/339; 455/67.15; 455/554.2; 375/355; 375/360; 454/51; 454/52
(58) Field of Classification Search ............. 455/452.2, 455/296, 306, 307, 339, 67.15, 554.2, 151.2; 375/355, 360; 454/52, 51
See application file for complete search history.

(56) References Cited

U.S. PATENT DOCUMENTS

| 4,729,295 | A | * | 3/1988 | Osawa et al. .................. 454/52 |
| 6,452,915 | B1 | | 9/2002 | Jorgensen |
| 6,683,919 | B1 | * | 1/2004 | Olgaard et al. ............. 375/316 |
| 6,741,862 | B1 | * | 5/2004 | Chung et al. ............. 455/452.1 |
| 6,850,580 | B1 | * | 2/2005 | Naoe .......................... 375/355 |

| 2002/0136286 | A1 | * | 9/2002 | Koo ........................... 375/225 |
| 2003/0093364 | A1 | * | 5/2003 | Bae et al. ..................... 705/37 |

FOREIGN PATENT DOCUMENTS

EP  0 912 016  4/1999

OTHER PUBLICATIONS

W.Y. Yeo et al ."Enhanced rate control scheme for 1xEV-DO reverse traffic channels, " Electronic Letters, IEEE Stevenage, vol. 39, No. 23, Nov. 13, 2003, pp. 1677-1679.*

(Continued)

*Primary Examiner*—Nick Corsaro
*Assistant Examiner*—Sanh Phu
(74) *Attorney, Agent, or Firm*—Philip Wadsworth; Sandra L. Godsey; S. Hossain Beladi

(57) ABSTRACT

A method and apparatus for determining the data rate of a reverse link communication of an access terminal includes receiving a reverse activity bit (RAB) from an access point in the communication system, and passing the RAB to a digital filter to produce a filtered RAB. In one embodiment, the reverse link data rate is determined based on the filtered value of the RAB. Furthermore, a processor in the access terminal may determine whether the access terminal is in an idle mode, and passing a non-busy state value of the RAB to the digital filter when the access terminal is in the idle mode. The filtered RAB may be compared to a threshold to determine a mode of reverse link data rate determination. The mode defines a set of criteria for an aggressiveness level of increasing or decreasing the reverse link communication data rate. The processor, therefore, determines the data rate based on the filtered reverse activity bit in accordance with the determined mode.

15 Claims, 6 Drawing Sheets

OTHER PUBLICATIONS

W.Y. Yeo et al., "Enhanced rate control scheme for 1xEV-DO reverse traffic channels," Electronics Letters, IEE Stevenage, vol. 39, NO. 23, Nov. 13, 2003, pp. 1677-1679.

Young-uk Chung et al., "An Efficient Reverse Link Data Control Scheme for 1xEV-DV System," IEEE 54th Vehicular Technology Conference, vol. 1 of 4, conf. 54, Oct. 7, 2001, pp. 820-823.

3GPP2 C: "cdma2000 High Rate Packet Data Air Interface Specification C.S0024," Sep. 12, 2000, pp. 6-1 to 8-54.

* cited by examiner

ADAPTIVE DATA RATE DETERMINATION FOR A REVERSE LINK COMMUNICATION IN A COMMUNICATION SYSTEM

BACKGROUND OF THE INVENTION

The invention relates generally to the field of telecommunications, and more particularly to systems and methods for improving the performance of data transmissions in wireless telecommunications systems.

In a typical wireless voice/data communications system, a base station is associated with an area of coverage. This area is referred to as a sector. Mobile stations which are within the sector can transmit data to the base station and receive data from the base station. In the context of data communications in particular, base stations may be referred to as access networks, and mobile stations may be referred to as access terminals. Access terminals can communicate simultaneously with more than one access network and, as an access terminal moves, the set of access networks with which it communicates may change.

The parameters for communications between a particular access network and a particular access terminal are based in part upon their relative positions and the quality and strength of the signals that are respectively transmitted and received by them. For example, as the access terminal moves farther away from the access network, the strength of the signal received from the access network by the access terminal will decrease. Accordingly, the error rate of the received data will increase. The access network may therefore typically compensate for the increased distance by reducing the rate at which it transmits data to the access terminal. This allows the access terminal to receive and decode the access network's signal with fewer errors. When the access terminal moves closer to the access network, the signal strength increases, so a higher data rate can be used to transmit data to the access terminal.

Similarly, as the access terminal moves farther away from the access network, the strength of the signal received from the access terminal by the access network may decrease, thereby potentially resulting in a higher error rate. Like the access network, the access terminal may typically also compensate for the increased distance by decreasing its data rate to allow the access network to receive the signal with fewer errors. The access terminal may also increase its power output to reduce the error rate if requested by the access network. Again, when the access terminal moves closer to the access network, the stronger signal may support a higher data rate.

In one system, the access terminal is responsible for determining the rate at which data may be transmitted from the access terminal to the access network. This rate is determined based upon a number of factors. The primary factors are the absolute maximum rate at which the access terminal and access network can communicate, the maximum rate based upon the allowable power output of the access terminal, the maximum rate justified by the amount of data which the access terminal has in queue, and the maximum rate allowable based upon ramp-up constraints. In this system, each of these rates presents a hard limit that cannot be exceeded by the selected data rate. In other words, the selected data rate is no higher than the minimum of these four rates.

The first two of these rates (the absolute and power-limited maximum rates) result from physical constraints of the system and are outside the control of the access terminal. The third and fourth rates (the data-justified and ramp-up-limited rates) are variable and are dynamically determined based upon the specific prevailing conditions at the access terminal.

The data-justified rate is essentially the maximum rate that can be justified by the amount of data that is queued for transmission by the access terminal. For example, if the access terminal has 1000 bits in its transmit queue, then a data rate of 38.4 kbps (1024 bits/frame) is justified, but a higher rate of 76.8 (2048 bits/frame) may not be justified. A time frame may be defined in a unit of time, for example in the cdma2000 1×EV-DO system defined by the IS-856 standard, one time frame is 26.666 ms. If there is no data in the access terminal's transmission queue, then no transmission rate at all is justified.

The ramp-up-limited rate is the maximum rate that is allowed, considering the fact that a rapid ramp-up may suddenly increase the interference perceived by other access terminals and may degrade their performance. If the ramp-up of each access terminal is limited, then the level of interference which it causes may change more slowly and the other access terminals can more easily adjust their operating data rates and transmit powers to adapt to the increased interference. It should be noted that the ramp-up-limited rate is also computed to control the ramp-down of data rates. The overall effect is to minimize wide and/or rapid fluctuations in data rates and to thereby stabilize the overall operation of the access network and access terminals in the system.

While the change in the ramp-up-limited rate is controlled (in regard to both increasing and decreasing data rates), the data-justified rate is not. If the access terminal suddenly has enough data to justify a very high rate, the data-justified rate may suddenly increase. If the access terminal runs out of data, the data-justified rate may suddenly drop to zero. Sudden increases in the data-justified rate typically are not problematic because the ramp-up-limited rate is controlled. Since the minimum of the four rates noted above sets a maximum for the selected data rate, the ramp-up-limited rate may control in this situation. Sudden decreases in the data-justified rate may, however, cause the actual data rate to drop since the data-justified rate is lower than the other rates and may therefore control (keeping in mind that the data rate selected for transmission of data over the next frame is the minimum of the four rates).

In prior art systems, if an access terminal has no data to transmit, no data is transmitted. This is certainly intuitive, and conventional wisdom dictates that useful bandwidth should not be wasted by transmitting useless data. One of the problems that results from allowing the data rate to drop precipitously (to zero, for example) is that it takes some amount of time for the data rate to ramp back up, as explained above. Delays in the transmission of some data may result from the drop and subsequent ramping up of the data rate. This delay is particularly likely in the case of data that is bursty or has discrete arrival processes. One such type of data is real-time video which may comprise 500–1000 byte packets that arrive at the transmit queue at discrete intervals of 60–70 milliseconds. Real-time video is also a notable example of the types of data for which transmission delays are particularly noticeable and therefore unacceptable. Network gaming is another class of applications where data arrivals are sporadic and data latency is a key performance metric. Therefore, there is a need for a method and apparatus for an adaptive determination of data rate for quick ramp up of data rate while minimizing the undesirable effects in a communication system.

SUMMARY OF THE INVENTION

While the ramp-up-limited rate is designed to prevent an access terminal from increasing its data rate in a manner that produces too much interference for other access terminals, there are instances in which the additional interference is not too disruptive. Various aspects of the invention provides for a method to detect if there are few access terminals active in the sector, such that it may be acceptable for a particular access terminal to increase its data rate more rapidly than otherwise allowed by the ramp-up-limited rate. When there are few active access terminals in the sector, any ramp up limit imposed by the ramp-up-limited rate may reduce the overall performance of the system. As such, by qualitatively determining the effect of the active access terminals in the sector, in a form of monitoring the reverse link activity bit and its historical values, the ramp-up-limited rate may be allowed to ramp up to maximum for a quick ramp up of the data rate without substantially effecting the overall performance of the system, in accordance with various aspects of the invention.

Broadly speaking, the invention comprises systems and methods for improving the performance of data transmissions in wireless telecommunications systems by computing a reverse link data transmission rate which allows quick ramp of the data rate for the transmission of bursty data. One embodiment of the invention comprises a wireless communication system in which an access terminal is configured to determine a rate at which it may transmit data over a reverse link to an access network. The access terminal includes a transmit subsystem for transmitting the data and a processor which is coupled to the transmit subsystem and configured to provide control information thereto. In particular, the processor is configured to determine a data rate at which the transmit subsystem may send data over the reverse link. In one embodiment, the processor is configured to compute a data-justified rate and a closed-loop resource allocation rate. The processor then chooses the minimum of the data-justified rate, the closed-loop resource allocation rate, an absolute maximum rate and a power-limited rate as the data transmission rate for the next transmission frame. The processor controls the closed-loop resource allocation rate to reach a maximum level when the statistical data associated with a reverse activity bit (RAB) meets a predefined criteria. As such, various aspects of the invention allow the communication on the reverse link to make a quick start in the data rate for transmission of data when the RAB meets the predefined criteria. This is accomplished in one embodiment by maintaining statistical data associated with the RAB in a digital filter in the processor.

One embodiment of the invention comprises a method for improving performance in data transmissions on a reverse link from an access terminal to an access network, wherein the method comprises computing a first data transmission rate, transmitting data on the reverse link at the first data transmission rate, wherein when the access terminal has received RAB over a period of time that meets a predefined statistical criteria indicating the wireless communication system is in a not-busy state, the first data transmission rate is allowed to ramp-up to a maximum level. In one embodiment, the allowed maximum level may be limited by other rate determining parameters.

One embodiment of the invention comprises a wireless communication system in which an access terminal is configured to determine a rate at which it may transmit data over a reverse link to an access network. The access terminal includes a transmit subsystem for transmitting the data and a processor which is coupled to the transmit subsystem and configured to provide control information thereto. In particular, the processor is configured to compute a first data transmission rate, transmit data on the reverse link at the first data transmission rate, wherein the method comprises computing a first data transmission rate, transmitting data on the reverse link at the first data transmission rate, wherein when the access terminal has received RAB over a period of time that meets a predefined statistical criteria indicating the wireless communication system is in a not-busy state, the first data transmission rate is allowed to ramp-up to a maximum level. In one embodiment, the allowed maximum level may be limited by other rate determining parameters.

A method and apparatus for determining the data rate of a reverse link communication of an access terminal includes receiving a reverse activity bit (RAB) from an access point in the communication system, and passing the RAB to a digital filter to produce a filtered RAB. In one embodiment, the reverse link data rate is determined based on the filtered value of the RAB. Furthermore, a processor in the access terminal may determine whether the access terminal is in an idle mode, and passing a non-busy state value of the RAB to the digital filter when the access terminal is in the idle mode. The filtered RAB may be compared to a threshold to determine a mode of reverse link data rate determination based. The mode defines a set of criteria for an aggressiveness level of increasing or decreasing the reverse link communication data rate. The processor, therefore, determines the data rate based on the filtered reverse activity bit in accordance with the determined mode.

Another embodiment of the invention comprises a software application. The software application is embodied in a medium readable by a computer or other data processor employed in an access terminal. The medium may comprise a floppy disk, hard disk drive, CD-ROM, DVD-ROM, RAM, ROM, or the like. The medium contains instructions which are configured to cause the computer or data processor to execute a method which is generally as described above. It should be noted that the computer readable medium may comprise a RAM or other memory which forms part of an access terminal. The access terminal's processor would thereby be enabled to perform a method in accordance with the present disclosure.

Numerous additional embodiments are also possible.

BRIEF DESCRIPTION OF THE DRAWINGS

Other objects and advantages of the invention may become apparent upon reading the following detailed description and upon reference to the accompanying drawings.

Figure 1:
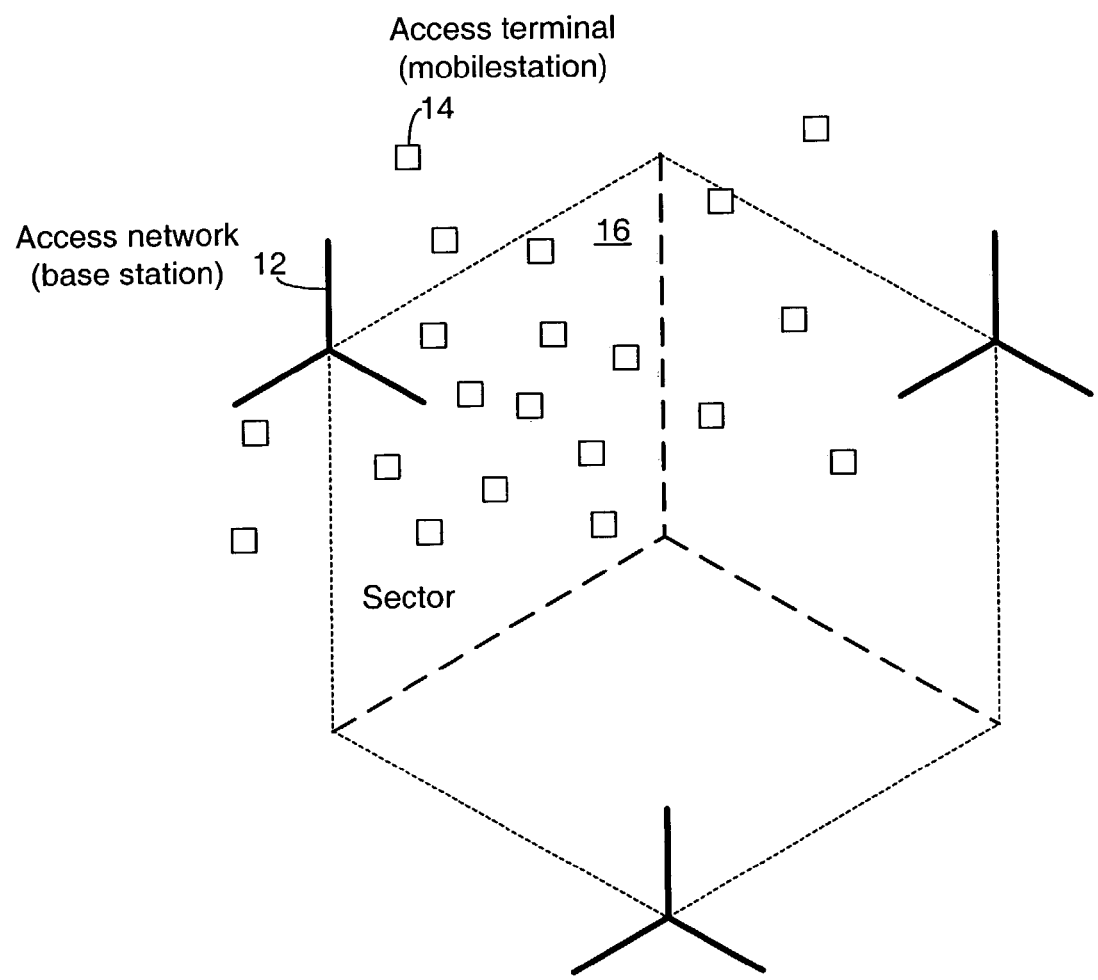
FIG. 1 is a diagram illustrating a portion of a wireless communication system capable of operating in accordance with various aspects of the invention.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION OF A PREFERRED EMBODIMENT

Broadly speaking, the invention comprises systems and methods for improving the performance of data transmissions in wireless telecommunications systems by controlling the increase and decrease in the data transmission rate for a reverse link.

Referring to FIG. 1, a diagram illustrating a portion of a wireless communication system in accordance with one embodiment is shown. In this embodiment, the system comprises a plurality of access networks 12 and a plurality of access terminals 14. Each access networks 12 communicates with access terminals 14 in the surrounding area. Access terminals may move within the sector, or they may move from a sector associated with one access. network to a different sector associated with another access network. The area of coverage is a sector 16. Although the sectors may in actuality be somewhat irregular, and may overlap with other sectors, they are depicted in the figure as being generally delineated by the dotted and dashed lines. It should be noted that, for the sake of clarity, only one of each of the access networks, access terminals and sectors is identified by reference numbers.

Figure 2:
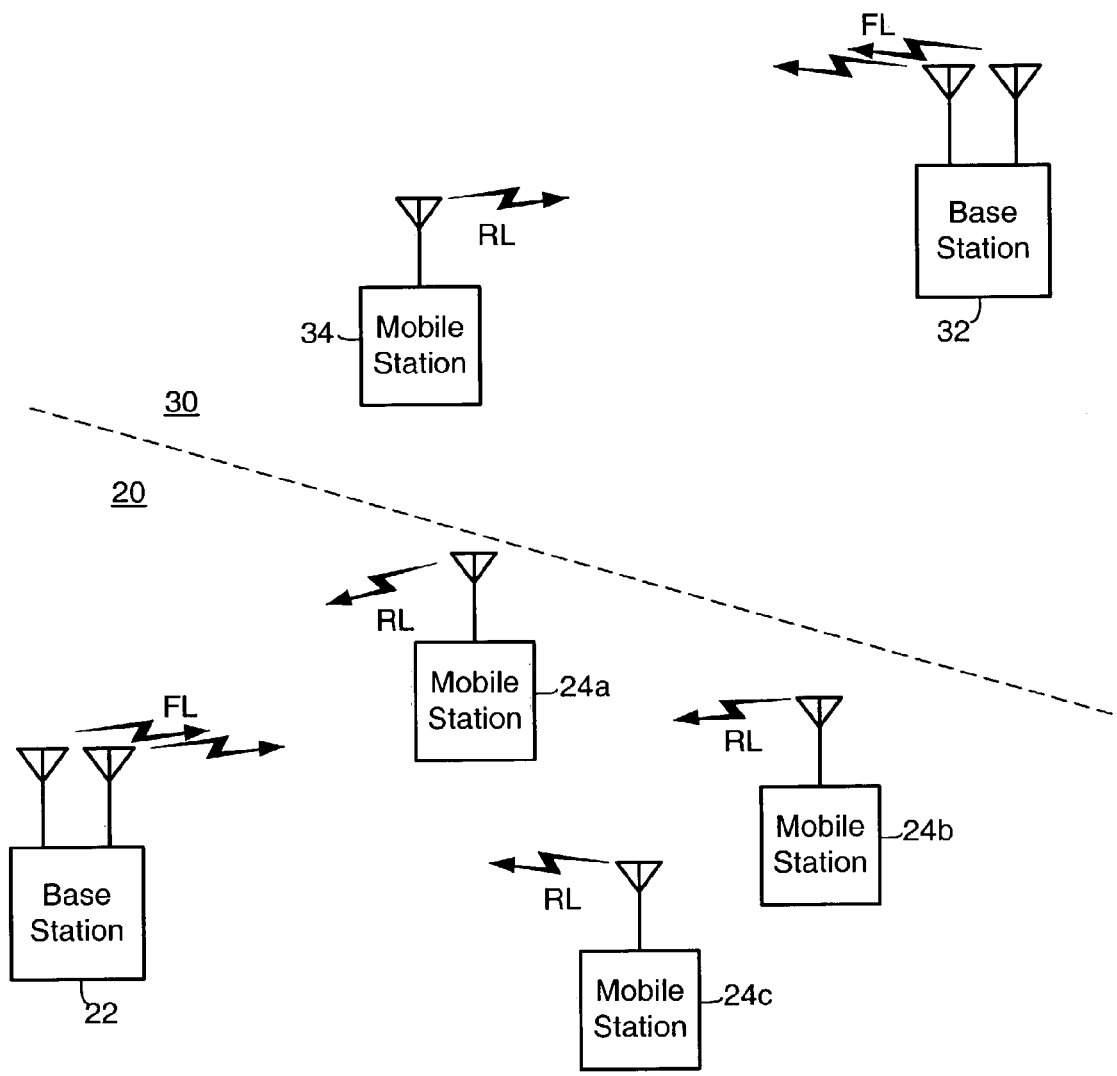
FIG. 2 is a more detailed diagram illustrating the access networks and access terminals in two adjoining sectors of a wireless communication system capable of operating in accordance with various aspects of the invention.

Referring to FIG. 2, a more detailed diagram illustrating the access networks and access terminals in two adjoining sectors of a wireless communication system in one embodiment is shown. In this system, sector 20 includes an access network 22 and several access terminals 24. Sector 30 includes an access network 32 and a single access terminal 34. Access networks 22 and 32 transmit data to the access terminals 24 and 34 via what is referred to herein as a forward link (FL). Access terminals 24 and 34 transmit data back to access networks 22 and 32 via what is referred to as a reverse link (RL).

Figure 3:
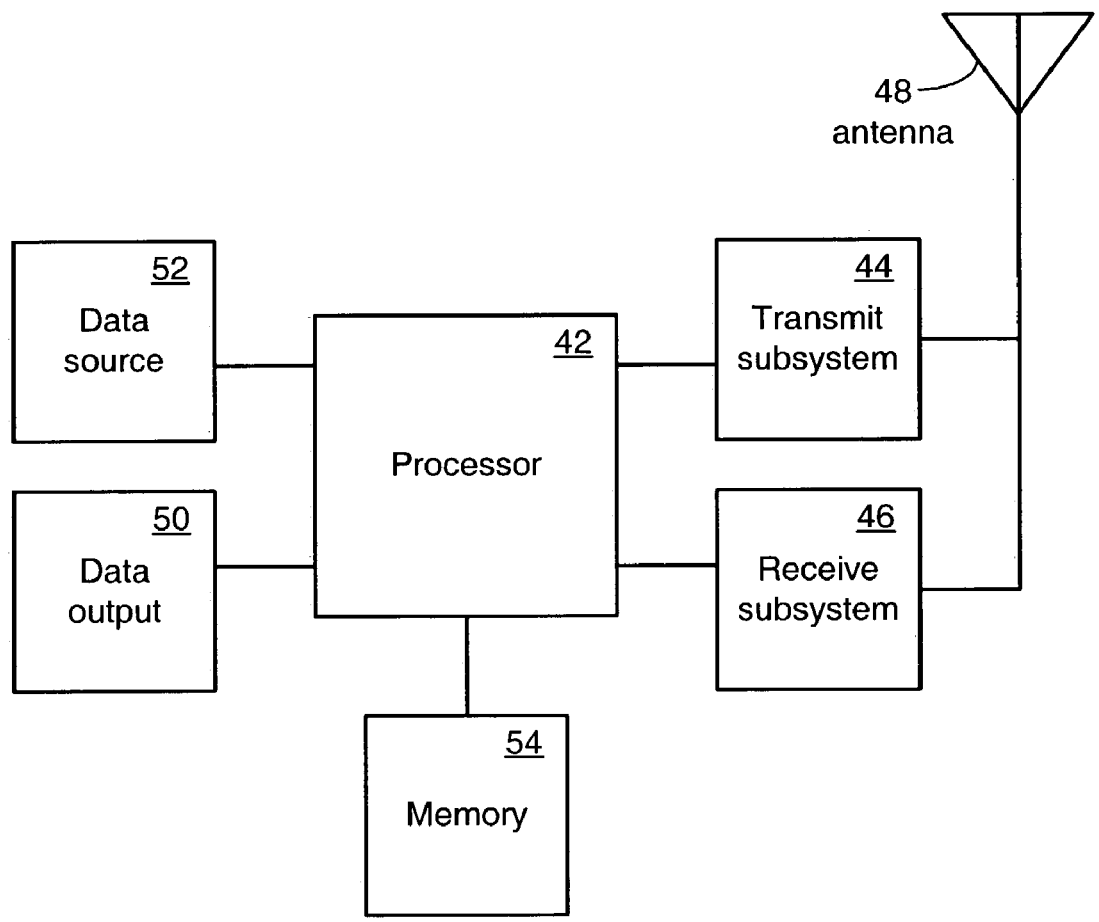
FIG. 3 is a functional block diagram illustrating the structure of an access terminal capable of operating in accordance with various aspects of the invention.

Referring to FIG. 3, a functional block diagram illustrating the structure of an access terminal in one embodiment is shown. In this embodiment, the access terminal comprises a processor 42 coupled to a transmit subsystem 44 and a receive subsystem 46. Transmit subsystem 44 and receive subsystem 46 are coupled to shared antenna 48. Processor 42 receives data from receive subsystem 46, processes the data, and outputs the processed data via output device 50. Processor 42 also receives data from data source 52 and processes the data for transmission. The processed data is then forwarded to transmit subsystem 44 for transmission over the reverse link. In addition to processing the data from receive subsystem 46 and data source 52, processor 42 is configured to control the various subsystems of the access terminal. In particular, processor 42 controls transmit subsystem 44. The access terminal-based functionality described below is implemented in processor 42. Memory 54 is coupled to processor 42 for storage of data used by the processor.

In one embodiment, the system is a cdma2000 1×EV-DO system. The primary characteristics of this system are defined by the commonly known IS-856 data communication standard. This standard is based on the IS-95 family of code division multiple access (CDMA) standards. The name "1×EV-DO" refers to the relation to the cdma2000 family ("1×") and the evolution of the standard ("EV") for data optimized ("DO") operation. The 1×EV-DO system is mainly optimized for wireless Internet access for which a high data throughput on the Forward Link is desirable.

A 1×EV-DO system is designed to communicate data on the forward link at one of the 12 different predetermined data rates ranging from 38.4 kbps to 2.4 Mbps (in addition to the null rate). Corresponding data packet structures are defined (specifying such payments as packet duration, modulation type, etc) for each of these predetermined data rates. Communications on the reverse link take place at one of five different data rates ranging from 9.6 kbps to 153.6 kbps (plus the null rate). Again, data packet structures are defined for each of these data rates.

The present invention relates primarily to the reverse link. Accordingly, the data rates for the reverse link are set forth below.

| Rate | data rate | |
|---|---|---|
| Index | Kbps | bits/frame |
| 0 | 0 | 0 |
| 1 | 9.6 | 256 |
| 2 | 19.2 | 512 |
| 3 | 38.4 | 1024 |
| 4 | 76.8 | 2048 |
| 5 | 153.6 | 4096 |

For the sake of simplicity in the following discussion, the reverse link data rates will be referred to in terms of the rate index, rather than the number of bits per second frame.

As indicated above, the present 1×EV-DO-based system is built on CDMA standards. Data that is transmitted over the reverse link is consequently code division multiplexed. That is, the data corresponding to each access terminal is identified by a corresponding code. Each code defines a communication channel. Thus, data from any or all of the access terminals can be transmitted at the same time, and the access network can distinguish the different sources of the data using the codes.

Code division multiple access (CDM) transmissions are interference limited. In other words, the amount of data that can be transmitted is limited by the amount of interference that is present in the environment. While there is a certain amount of interference caused by background or thermal noise, the primary sources of interference with an access terminal's transmissions are the other access terminals in the area. If there are few other access terminals and they are transmitting little data, there will be little interference, so it may be possible to transmit data at a high data rate. On the other hand, if there are many other access terminals that are transmitting large aggregate amounts of data, the level of interference will be higher, and it may only be possible to use a very low data rate for reverse link transmissions.

A mechanism must therefore be provided for determining appropriate data rates for each of the access terminals. Typical CDMA wireless communication systems use a small set of data rates for all of the access terminals. A set of 2 possible data rates is typical in the systems operating in accordance with the IS-95 standard. Certain CDMA communication systems providing voice and data communications use some form of a centralized control, whereby the information needed to allocate rates is gathered in one central location, and then rate allocations are transmitted back to each access terminal. A centralized rate control algorithm is not necessarily defined by the process of allocating the same rate to all access terminals. The difficulties with a centralized control are: 1) Computation of optimal rates for all access terminals can be difficult and computationally intensive, 2) Communication costs for control signaling to and from the access terminals can be excessive, and 3) The validity of the "optimal" rate allocation is questionable once delays and uncertainty about the future needs of the network and its behavior are considered.

One way in which the present system differs from typical systems is that the calculation of the data rates for the access terminals is the responsibility of each individual access terminal. In other words, it is distributed rather than centralized. The appropriate data rate for a particular access terminal is determined by that access terminal itself using a reverse link Mac algorithm. ("Mac" is an industry term for multi-access communications.) The reverse link Mac algorithm is discussed further.

When a particular access terminal is calculating the data rate for its reverse link, it obviously would want to select the highest possible rate. There may, however, be other access terminals in the sector. These other access terminals would also try to transmit their data at the highest possible rate. Since the power required to transmit the data is roughly proportional to the data rate, increasing the data rates of each access terminal would also increase the power of their transmissions. Each access terminal's transmissions would then present an increasing amount of interference to the other access terminals. At some point, there would be so much interference that none of the access terminals would be able to transmit their data with an acceptable error rate.

It is therefore useful for the access terminals to have information on the level of interference present in the system. If the level of interference is relatively low, the access terminals can increase their data rates to some extent without causing a significant adverse impact on the overall performance of the system. If the level of interference is too high, however, increases in the access terminals' data rates may have a significant adverse impact.

The overall level of interference is therefore tracked in one embodiment by the access network. The access network is configured to simply determine whether the overall level of interference is above or below a threshold value. If the interference level is below the threshold, indicating a level of activity, the access network sets a reverse activity bit (RAB) to 0. The RAB is also sometimes referred to as a "busy bit." If the interference level is above the threshold, indicating a level of activity, the access network sets RAB=1. The RAB is then communicated to each of the access terminals to inform them of the level of activity/interference in the system.

In one embodiment, the overall interference level is computed by summing the power of each access terminal's reverse link transmissions and dividing by the level of thermal, or background, noise in the environment. The sum is then compared to a threshold. If the sum is more than the threshold, then the interference level is considered to be high, and the RAB is set to 1. If the sum is less than the threshold, then the interference level is considered to be low, and the RAB is set to 0.

Because the performance of reverse link data communications is dependent upon the data rate and the level of interference in the system, it is necessary to take into account the level of interference in computing the appropriate data rate. The data rate calculation in the reverse link Mac algorithm therefore takes into account the interference level as provided to the access terminals in the form of the RAB, in accordance with various aspects of the invention. The reverse link Mac algorithm also takes into account factors such as the needs of the access terminal and the physical constraints of the system. Based upon these factors, the data rate for each access terminal is calculated once each frame.

The reverse link Mac algorithm is computed essentially as follows.

$$R_{new} = \min(R_1, R_2, R_3, R_4),$$

where
- $R_1$ is the system's maximum data rate,
- $R_2$ is the maximum data rate of the access terminal, based upon the maximum allowed transmit power considerations,
- $R_3$ is the data rate justified by the data in queue to be transmitted, and
- $R_4$ is the Closed-Loop Resource Allocation rate which is based on the RAB, in accordance with various aspects of the invention.

Each of rates $R_1$–$R_4$ sets a hard limit on $R_{new}$. In other words, rate $R_{new}$ selected by the reverse link Mac algorithm must not exceed any one of rates $R_1$–$R_4$.

The system's maximum data rate, $R_1$, is based upon the design of the system, including the access network and the access terminal. The data rate $R_1$ may be set by the access network, but is rarely changed, and can be considered static. The data rate $R_1$ is therefore simply stored in the access terminal for use in calculating $R_{new}$.

As mentioned above, the power of a reverse link data transmission is roughly proportional to the rate at which the data is transmitted, so there is a maximum rate corresponding to the maximum power level and current channel conditions. The power-based maximum data rate, $R_2$, is based upon the maximum power of the access terminal's reverse link transmissions, which is a function of the design of the access terminal. While the actual maximum transmit power $P_{max}$ is static, $R_2$ varies as a function of $P_{max}$ and the current channel conditions. $R_2$ is related to the SINR of the access terminal's signal as seen at the access network, which varies due to channel gain and current data rate of the terminal.

The rate $R_3$ is the data rate justified by the data which is in the access terminal's queue waiting to be transmitted. $R_3$ is variable and is computed at every frame. The purpose of $R_3$ is to reduce the reverse link data rates of access terminals when they have little or no data to transmit in order to reduce their interference with other access terminals. Conventionally, $R_3$ is simply the rate which is necessary to transmit all of the data in the queue in a single frame. Thus, if there were 1025 to 2048 bits of data in the queue, a rate of 76.8 kbps would be selected. Referring to the table shown herein relating to the rate index, at rate index 4, transmitting data at 76.8 kbps, 2048 bits can be transmitted in one frame. If, on the other hand, there were 2049 bits of data in the queue, it would be necessary to select a rate of 153.6 kbps (4096 bits/slot) in order to transmit all of the data in a single frame. If there is no data in the queue, the justifiable rate is zero. Using this conventional method for computing $R_3$, the rate corresponding to $R_3$ may range from rate index 0 to rate index 5, regardless of the previous value of $R_3$.

The closed-loop resource allocation (CLRA) rate, $R_4$, is also computed once every frame. The purpose of $R_4$ is to keep the data rate of each access terminal from increasing unnecessarily too rapidly and thereby creating more interference than the other access terminals can accommodate. The CLRA rate is based upon the current rate and a set of predetermined probabilities of the rate changing upward or downward. The probabilities used in the computation of the CLRA rate essentially control the rate to keep it from changing too rapidly.

Figure 4:
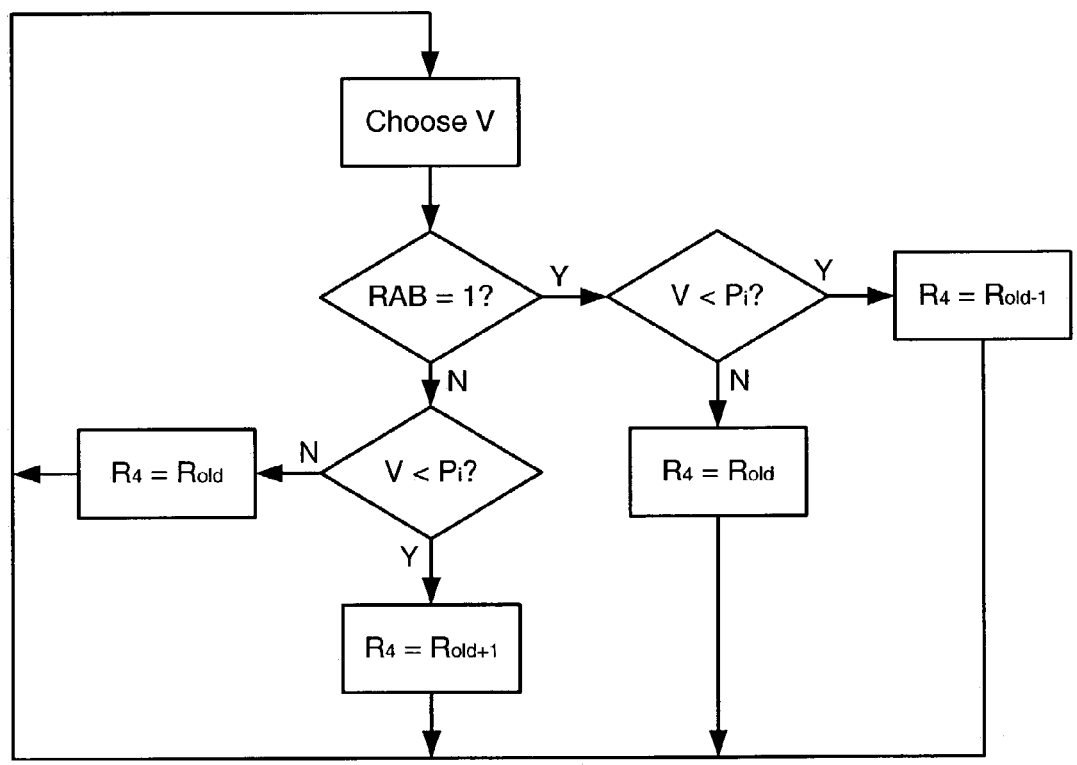
FIG. 4 is a flowchart illustrating the manner in which a closed-loop resource allocation rate is determined in accordance with various aspects of the invention.

The CLRA rate, $R_4$, is calculated in the following manner. A corresponding flow diagram is shown in FIG. 4.
(1) Choose a random number V, where $0 \leq V \leq 1$,
(2) then,
  (i) if RAB=0,
    if $V<P_i$, $R_4=R_{old}+1$
    else $R_4=R_{old}$
  (ii) if RAB=1,
    if $V<P_i$, $R_4=R_{old}-1$
    else $R_4=R_{old}$ where
$P_i$ is the probability corresponding to the current rate and RAB (see table below),
$R_{old}$ is the current rate,
$R_{old}+1$ is the next higher rate from the current rate, and
$R_{old}-1$ is the next lower rate from the current rate.

The probabilities, $P_i$, corresponding to the various rate indices and RAB values are shown in the following table. When the access terminal begins computation of the new data rate, it will be transmitting at a current rate. The access terminal will also receive a current RAB from the access network(s) that it is communicating with. The current rate determines from which row probability $P_i$ is taken. The current RAB determines from which column probability $P_i$ is taken.

In one embodiment, the probabilities are fixed and are pre-programmed into the access terminal. In other embodiments, the probability values may be computed by the access network and then downloaded to the access terminals.

TABLE 1

| | Probability | |
|---|---|---|
| rate index | RAB = 0 | RAB = 1 |
| 0 | 1 | 0 |
| 1 | $P_1$ | 0 |
| 2 | $P_2$ | $P_5$ |
| 3 | $P_3$ | $P_6$ |
| 4 | $P_4$ | $P_7$ |
| 5 | 0 | $P_8$ |

Each of the values listed in the table represents the probability that the access terminal, having the corresponding rate index and RAB values, will change to the next rate index. The values in the column under "RAB=0" are the probabilities that the access terminal will increase to the next higher rate index when RAB=0. The value corresponding to rate index 0 and RAB=0 is one because the access terminal is always allowed to move up from rate index 0 to rate index 1. The corresponding to rate index 5 and RAB=0 is zero because the access terminal cannot move up from rate index 5. Probability values $P_1$–$P_4$ range from zero to one.

The values in the column under "RAB=1" are the probabilities that the access terminal will decrease to the next lower rate index when RAB=1. The value corresponding to rate index 0 and RAB=1 is zero because the access terminal cannot move down from rate index 0. The value corresponding to rate index 1 and RAB=1 is zero because the access terminal is never forced to move down from the lowest non-zero rate. Probability values $P_5$–$P_8$ range from zero to one.

The effect of calculating $R_4$ in this way is to allow $R_4$ to increase in a controlled manner when the system is not busy (RAB=0) and to force it to decrease, also in a controlled manner, when the system is busy (RAB=1). In other words, it causes $R_4$ to ramp up, rather than simply jumping up, and to ramp down rather than dropping precipitously. The ramping up/down is controlled by the probabilities of Table 1.

However, the determination of $R_4$ may take into account a filtered value of RAB, along with a present value of RAB in accordance with various aspects of the invention. Even in a relatively loaded sector, the RAB usually may be unset (0) from time to time and vice versa. In this case, the RAB, due to fluctuations of signals and interference level, rather than RAB set to 1, RAB may be unset (0). The relative time that the RAB is 1 to the time the RAB is 0 is an indication of the loading of the sector, and one which is measurable directly by each AT. The filtered RAB value hence reflects sector loading, and used in accordance with various aspects of the invention to determine an optimum rate. If the RAB is unset, indicating a not busy state, while the sector is heavily loaded, the rate transition of should $R_4$ be conservative, avoiding large probability and/or step in transitioning $R_4$ from a low data rate to a high data rate. Although any direct information regarding the sector loading is not available to the access terminal, an indication of the sector loading may be estimated by using a filtered RAB from values received previously, in accordance with various aspects of the invention. If only a present value of the RAB is used, the most aggressive behavior that may be allowed in the rate determination of $R_4$ algorithm is an immediate jump from a rate to the next higher rate, which happens when the transition probability is set to 1. However, it may be necessary, in certain applications, for an access terminal to increase its $R_4$ rate by multiple levels in a frame to reduce latency, thus allowing a "quick-start" in the $R_4$ value. The access terminal may be "adapting" the aggressiveness of rate $R_4$ determination to the sector loading as indicated by the filtered value of RAB, in accordance with various aspects of the invention. The quick start for $R_4$ may be a transition from certain data rates to a higher data rate in one or more successions in accordance with various aspects of the invention.

The rates $R_1$–$R_4$ are determined each frame, and then the data rate for the next frame, $R_{new}$, is set to the minimum of these rates. Consider a video conferencing application that generates an average of 60 kbps of data. The data comprises packets of 500–1000 bytes in size which arrive at the transmit queue in intervals of 70–80 milliseconds. If there is originally no data in the queue (and the transmit data rate is 0), it will take up to one frame (approximately 27 milliseconds in one embodiment) to move up from a rate index of 0 (0 kbps) to 1 (9.6 kbps). Depending upon the specific probabilities employed by the access terminal, it may take several more frames to move from rate index 1 to 2 (19.2 kbps), and so on. Until the transmit data rate surpasses the 60 kbps arrival rate, the data continues to accumulate in the queue.

Assuming that the probabilities used to compute $R_4$ allow the rate index to increase on average by one level every two frames, it takes an expected six frames (160 milliseconds) to transmit the first 500-byte packet. In the meantime, the data that has accumulated behind this packet continues to be delayed. Even though the data transmission rate will eventually catch up with the data arrival rate, there will be a significant delay in transmitting at least a portion of the data. In applications such as videoconferencing, these delays are unacceptable. It should also be noted that, in this example, the data transmission rate will eventually exceed the arrival rate, and the amount of data in the queue will begin to drop. If the queue length drops to zero, $R_3$ will also drop to zero, and the ramp-up process will have to start over, once more causing delays in transmission.

Figure 5:
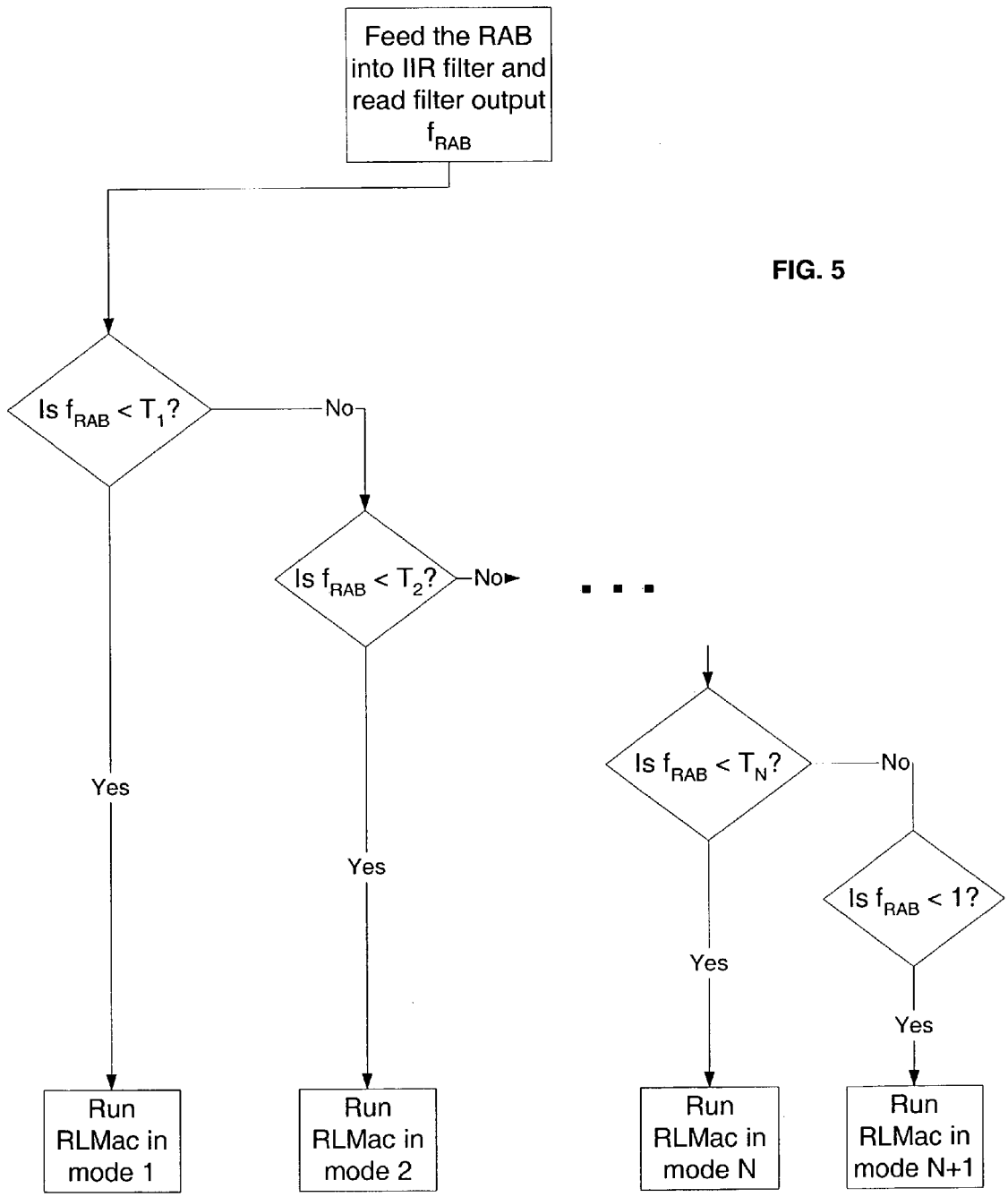
FIG. 5 is a flowchart illustrating the manner for determining various modes for determining the data rate of the reverse link, wherein each mode has a particular level of aggressiveness for increasing or decreasing the data rate.

In order to avoid the initial delays caused by sequential increase in the data rate, and a subsequent need to ramp the data rate back up, one embodiment of the present system employs use of filtered RAB, such that it allows a more or less aggressive behavior of determining $R_4$ in accordance with various aspects of the invention. For determining $R_4$, a number (N) of thresholds $T_i$ where $1 \leq i \leq N$ and $0 < T_1 < T_2 < \ldots < T_N < 1$ are defined. Corresponding to these thresholds are N+1 modes of operation for determining $R_4$. The differences between these modes are the transition probability vectors and the maximum rate transition step allowed in determining $R_4$. The mode of operation may be selected based on the value of the filtered RAB ($f_{RAB}$). The value of RAB may be fed into a digital filter with a fixed or variable time constant. The values of RAB received over a period of time, corresponding to the filter time constant, are accumulated. The mode of operation for determining the $R_4$ may be based on the value of $f_{RAB}$. If $m_i$ indicates a mode of operation, the modes of operation may be selected based of the value of $f_{RAB}$ as compared to the thresholds Ti. For example, as shown in FIG. 5, an algorithm for determining a mode of operation for calculating $R_4$ is shown in accordance with various aspects of the invention. The values of RAB as received are accumulated in a filter in the AT as shown in FIG. 3. Processor 42 may include a memory unit for implementing the filter. The algorithm as shown in FIG. 5 may be described as following:

select RLMac in $m_1$ if $0 \leq f_{RAB} < T_1$;
select RLMac in $m_i$, $2 \leq i < N$ if $T_{i-1} \leq f_{RAB} < T_i$;
select RLMac in $m_{N+1}$ if $T_N \leq f_{RAB} < 1$.

A more aggressive mode of operation may be used for a lower value of $f_{RAB}$. For example, mode $m_1$ may be the most aggressive mode allowing the $R_4$ value to transition from a data rate to another data rate multiple levels higher between successive frames. In addition, higher probabilities for an upward data rate transition of $R_4$ may correspond to a lower value of $f_{RAB}$, meaning the AT may increase its transmission rate with higher probability when the RAB is not set and sufficient data is available. The downward transition probabilities may also be lower so that the AT will drop its transmission rate with less likelihood when the RAB is set.

In one embodiment, there may be a total of 2 thresholds (N=2) and 3 modes. Modes 2 and 3 may allow upward transition of rates one level at a time, and with mode $m_1$ being the most aggressive of the three modes, allowing an immediate upward transition from the lowest rate to a designated rate multiple levels higher. For example, if mode $m_1$ is selected, the AT may be allowed immediate upward rate transition from 0 kbps to 38.4 kbps or 19.2 kbps if the last RAB is not set (sector not busy) and sufficient data is available. In another example, if mode $m_1$ is selected, the AT may be allowed immediate upward rate transition from any rate to 76.8 kbps or 153.6 kbps if the last RAB is not set (sector not busy) and sufficient data is available.

Figure 6:
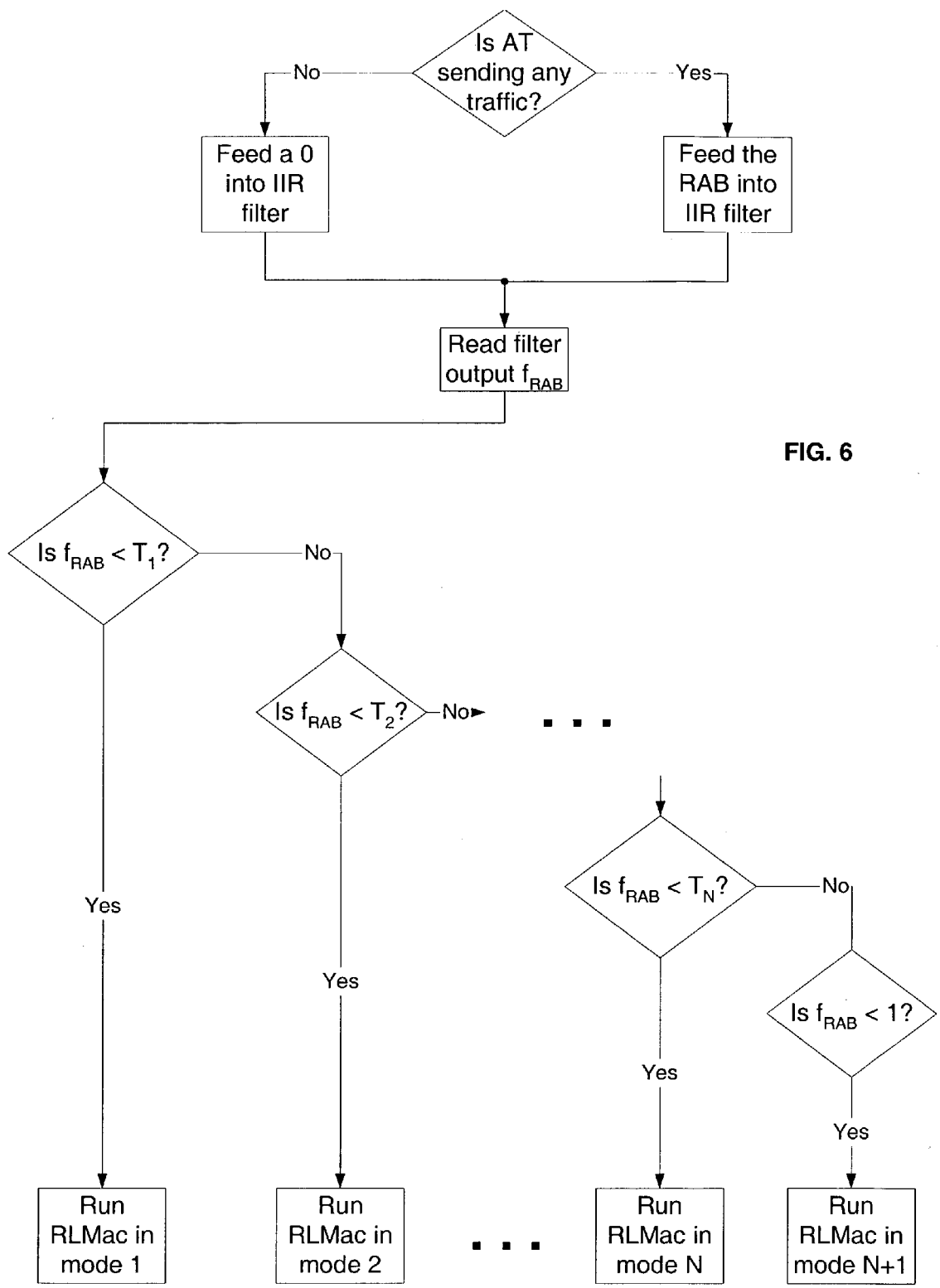
FIG. 6 is a flowchart illustrating the manner for determining various modes for determining the data rate of the reverse link, wherein each mode has a particular level of aggressiveness for increasing or decreasing the data rate. In particular, the flow chart incorporates the access terminals (AT) that are in the idle state.

In certain applications, the access terminals may be running certain applications which only require them to send data sporadically and stay idle (not send any data) at other times. For such access terminals, it is desirable to let the rate transition quickly to a higher rate so they can finish transmitting the burst of data and then remain idle till the next burst of data is available. As such, various aspects of the invention may be used to have multiple modes of rate determination for $R_4$, where the selected mode is based on the filter value of RAB. For access terminals that spend a long time in an idle period, the algorithm shown in FIG. 6 may be used to select the mode for calculations of $R_4$. The main difference of the algorithms shown in FIGS. 5 and 6 may relate to the data bits that are fed into the RAB filter. If the access terminal is sending data, the RAB value received from the access point may be fed into the filter. If the access terminal is not sending any data, the RAB filter may be fed with RAB values set to "0". The output of the filter is used to determine the modes of operation. In such a case, the access terminal in an idle mode may be allowed to have an aggressive mode for calculating the $R_4$ once new data arrives. Essentially, this is pretending that the sector is not loaded and thus allowing the AT to be more aggressive in ramp up of rate when data becomes available. Because data arrival events at idle access terminals are generally uncorrelated, such sporadic aggressive behavior can be controlled to maintain stable operation.

While the foregoing description is directed primarily to embodiments of the invention that comprise methods, it should be noted that other embodiments are possible. For example, one embodiment may comprise an access terminal configured to limit drops in a data-justified rate as described above. This embodiment may comprise a processor coupled to a transmit subsystem. The processor in one such embodiment is configured to compute a data rate for the reverse link on a frame-by-frame basis using threshold data, probability data, decay factor data and the like which is stored in a memory coupled thereto. The processor then provides control information, including the computed data rate, to the transmit subsystem, which transmits queued data to an access network. It should be noted that the components of the access terminal may vary from one embodiment to another.

Another embodiment may comprise an access terminal configured to enable rapid increases in a ramp-up-limited rate as described above. This embodiment may comprise a processor coupled to a transmit subsystem. The processor in one such embodiment is configured to compute a data rate for the reverse link on a frame-by-frame basis using threshold data, probability data, historical data rate information and the like which is stored in a memory coupled thereto. The processor then provides control information, including the computed data rate, to the transmit subsystem, which transmits queued data to an access network. Again, the components of the access terminal may vary from one such embodiment to another.

Still another embodiment may comprise a software application. The software application in this embodiment may be configured to receive information relating to the amount of queued data to be transmitted, the level of interference in the system (e.g., via the RAB), threshold data, probability data, decay factor data, and various other data, and to compute a limited-decrease data rate at which data will be transmitted from an access terminal. In another embodiment, the software application may be configured to receive information relating to whether or not a communication system is busy, probabilities that a data rate will increase or decrease, historical data rate information and the like, and to compute a rapid-increase data rate at which data will be transmitted from an access terminal to an access network. The software applications may be embodied in any of a variety of media readable by a computer or other data processor, such as a floppy disk, hard disk drive, CD-ROM, DVD-ROM, RAM, or ROM, to name a few.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A method for determining the data rate of a reverse link communication of an access terminal comprising:
   receiving a reverse activity bit from an access point in a communication system;
   passing said reverse activity bit to a digital filter to produce a filtered reverse activity bit, whereby a value of said reverse activity bit is accumulated; and
   determining said data rate based on said filtered reverse activity bit.

2. The method as recited in claim 1 further comprising:
   comparing said filtered reverse activity bit to a threshold;
   determining a mode of reverse link data rate determination based on said comparing, wherein said mode defines a set of criteria for an aggressiveness level of increasing or decreasing said reverse link communication data rate; and
   correlating said determining said data rate based on said filtered reverse activity bit in accordance with said mode of reverse link data rate determination.

3. A method for determining the data rate of a reverse link communication of an access terminal comprising:
   receiving a reverse activity bit from an access point in a communication system;
   passing said reverse activity bit to a digital filter to produce a filtered reverse activity bit;
   determining said data rate based on said filtered reverse activity bit;
   determining whether said access terminal is in an idle mode; and
   passing a non-busy state value of said reverse activity bit to said digital filter when said access terminal is in said idle mode regardless of actual value of said reverse activity bit.

4. An apparatus for determining the data rate of a reverse link communication of an access terminal comprising:
   means for receiving a reverse activity bit from an access point in a communication system;
   means for passing said reverse activity bit to a digital filter to produce a filtered reverse activity bit, whereby a value of said reverse activity bit is accumulated; and
   means for determining said data rate based on said filtered reverse activity bit.

5. The apparatus as recited in claim 4 further comprising:
   means for comparing said filtered reverse activity bit to a threshold;
   means for determining a mode of reverse link data rate determination based on said comparing, wherein said mode defines a set of criteria for an aggressiveness level of increasing or decreasing said reverse link communication data rate; and
   means for correlating said determining said data rate based on said filtered reverse activity bit in accordance with said mode of reverse link data rate determination.

6. An apparatus for determining the data rate of a reverse link communication of an access terminal comprising:
   means for receiving a reverse activity bit from an access point in a communication system;
   means for passing said reverse activity bit to a digital filter to produce a filtered reverse activity bit;
   means for determining said data rate based on said filtered reverse activity bit;
   means for determining whether said access terminal is in an idle mode; and
   means for passing a non-busy state value of said reverse link activity bit to said digital filter when said access terminal is in said idle mode regardless of actual value of said reverse activity bit.

7. An apparatus for determining the data rate of a reverse link communication of an access terminal comprising:
   a receiver for receiving a reverse activity bit from an access point in a communication system; and
   a processor for passing said reverse activity bit to a digital filter to produce a filtered reverse activity bit for determining said data rate based on said filtered reverse activity bit, whereby a value of said reverse activity bit is accumulated.

8. The apparatus as recited in claim 7 wherein:
   said processor including instructions for comparing said filtered reverse activity bit to a threshold, for determining a mode of reverse link data rate determination based on said comparing, wherein said mode defines a set of criteria for an aggressiveness level of increasing or decreasing said reverse link communication data rate, and correlating said determining said data rate based on said filtered reverse activity bit in accordance with said mode of reverse link data rate determination.

9. An apparatus for determining the data rate of a reverse link communication of an access terminal comprising:
   a receiver for receiving a reverse activity bit from an access point in a communication system; and
   a processor for passing said reverse activity bit to a digital filter to produce a filtered reverse activity bit for determining said data rate based on said filtered reverse activity bit wherein:
   said processor including instructions for determining whether said access terminal is in an idle mode; and said processor further for passing a non-busy state value of said reverse activity bit to said digital filter when said access terminal is in said idle mode regardless of actual value of said reverse activity bit.

10. A method for determining the data rate of a reverse link communication of an access terminal comprising:
receiving a reverse activity bit from an access point in a communication system;
passing said reverse activity bit to a digital filter to produce a filtered reverse activity bit;
determining whether said access terminal is in an idle mode;
passing a non-busy state value of said reverse activity bit to said digital filter when said access terminal is in said idle mode;
comparing said filtered reverse activity bit to a threshold;
determining a mode of reverse link data rate determination based on said comparing, wherein said mode defines a set of criteria for an aggressiveness level of increasing or decreasing said reverse link communication data rate; and
determining said data rate based on said reverse activity bit in accordance with said mode of reverse link data rate determination.

11. An apparatus for determining the data rate of a reverse link communication of an access terminal comprising:
means for receiving a reverse activity bit from an access point in a communication system;
means for passing said reverse activity bit to a digital filter to produce a filtered reverse activity bit;
means for determining whether said access terminal is in an idle mode;
means for passing a non-busy state value of said reverse activity bit to said digital filter when said access terminal is in said idle mode;
means for comparing said filtered reverse activity bit to a threshold;
means for determining a mode of reverse link data rate determination based on said comparing, wherein said mode defines a set of criteria for an aggressiveness level of increasing or decreasing said reverse link communication data rate; and
means for determining said data rate based on said reverse activity bit in accordance with said mode of reverse link data rate determination.

12. The method as recited in claim 1, further comprising:
selecting a mode of reverse link data rate determination based on said filtered reverse activity bit, resulting in a selected mode;
wherein the step of determining said data rate comprises applying the selected mode to the reverse activity bit.

13. A method for determining the data rate of a reverse link communication of an access terminal comprising:
receiving a reverse activity bit from an access point in a communication system;
passing said reverse activity bit to a digital filter to produce a filtered reverse activity bit;
determining said data rate based on said filtered reverse activity bit;
selecting a mode of reverse link data rate determination based on said filtered reverse activity bit, resulting in a selected mode;
wherein the step of determining said data rate comprises applying the selected mode to the reverse activity bit; and
wherein the step of passing comprises:
passing said reverse activity bit to the digital filter when the access terminal is not in an idle state; and
passing to the digital filter a value corresponding to said reverse activity bit being in a non-busy state when the access terminal is in the idle state regardless of actual value of said reverse activity bit.

14. A method for determining a closed-loop resource allocation (CLRA) rate limit on data rate of a reverse link communication of an access terminal in a code division multiple access (CDMA) communication system, the method comprising:
receiving at the access terminal a reverse activity bit from an access point in the CDMA communication system;
estimating an indication of sector loading by using a filtered said reverse activity bit from values received previously; and
determining the CLRA rate limit based on the indication of sector loading.

15. The method as recited in claim 14, further comprising:
selecting a mode of reverse link data rate determination based on the indication of sector loading, resulting in a selected mode;
wherein the step of determining the CLRA rate limit comprises processing the reverse activity bit in accordance with the selected mode.

* * * * *